United States Patent [19]

Horst et al.

[11] 3,846,348

[45] Nov. 5, 1974

[54] HIGH IMPACT, FIRE RETARDANT, RIGID POLYURETHANE FOAM COMPOSITIONS HAVING HIGH RESISTANCE TO BOILING WATER AND PRODUCTS THEREFROM

[75] Inventors: Raymond W. Horst, Cincinnati; Victor G. Soukup, Wyoming, both of Ohio

[73] Assignee: Cincinnati Milacron Inc., Cincinnati, Ohio

[22] Filed: July 24, 1972

[21] Appl. No.: 274,616

Related U.S. Application Data

[63] Continuation-in-part of Ser. No. 876,601, Nov. 13, 1969, abandoned.

[52] U.S. Cl.. 260/2.5 AJ, 260/2.5 AN, 260/2.5 AS, 260/2.5 AJ
[51] Int. Cl.................. C08g 22/48, C08g 51/58
[58] Field of Search...... 260/2.5 AJ, 2.5 AZ, 2.5 AS

[56] References Cited
UNITED STATES PATENTS

| | | | |
|---|---|---|---|
| 3,058,941 | 10/1962 | Birum | 260/2.5 AJ |
| 3,547,842 | 12/1970 | Bright | 260/2.5 AJ |
| 3,639,535 | 2/1972 | Kuehn | 260/2.5 AJ |
| 3,707,586 | 12/1972 | Turley | 260/2.5 AJ |
| 3,728,288 | 4/1973 | Cobbs | 260/2.5 AZ |

FOREIGN PATENTS OR APPLICATIONS

| | | | |
|---|---|---|---|
| 6,810,296 | 1/1969 | Netherlands | 260/2.5 AZ |

*Primary Examiner*—Donald E. Czaja
*Assistant Examiner*—C. Warren Ivy
*Attorney, Agent, or Firm*—Plumley & Tyner

[57] ABSTRACT

Rigid polyurethane foam is formed by processes employing an organic compound or mixture of organic compounds that are non-reactive to isocyanate groups, which organic compound or mixture of organic compounds has an average molecular weight of at least 500 and contains chlorine, bromine and phosphorus. The rigid polyurethane foam moldings obtained by the processes are flame-resistant while being resistant to impact and boiling water.

15 Claims, No Drawings

HIGH IMPACT, FIRE RETARDANT, RIGID POLYURETHANE FOAM COMPOSITIONS HAVING HIGH RESISTANCE TO BOILING WATER AND PRODUCTS THEREFROM

This application is a continuation-in-part of Ser. No. 876,601, filed Nov. 13, 1969, now abandoned.

This invention relates to novel polyurethane foam compositions and processes which yield rigid foam moldings of superior quality, in particular rigid foam moldings having a combination of flame-resistance while being impact resistant and resistant to boiling water. Additionally, this invention relates to useful products obtained with said processes. Further this invention relates to foam molding processes wherein essentially stable foamable compositions, which exhibit essentially consistent foaming and molding behavior, are employed.

The molding of polyurethane foam to produce rigid cellular articles useful in commerce is well known in the art. Many of these articles have structural integrity and make use of the relatively high strength to weight ratio of rigid cellular polyurethanes. Thus, articles such as trays, doors, tables, drawers and even chairs made from rigid polyurethane foam are known to the art.

Useful and structurally sound as many of these prior art moldings may be, they often lack fire resistance and especially fire resistance in combination with the requisite physical properties such as high impact resistance and high resistance to boiling water. In many applications, however, fire resistance in combination with high physical strength properties and high resistance to environmental conditions such as boiling water are, or are becoming, of prime importance.

In the prior art to achieve at least a measure of fire retardancy in the rigid foam moldings, fire-retardant additives were incorporated in the polyurethane foam formulations. The fire-retardant additives comprised halogen and/or phosphorus containing compounds which may or may not be reactive with isocyanate. Those which were not reactive with isocyanate were termed non-reactive fire retardants and are often organic esters of phosphoric or phosphorous acid which may or may not contain halogen atoms. The non-reactive type fire retardant additives also included halogen containing organic compounds which did not contain phosphorus atoms (e.g., organic compounds containing chlorine and/or bromine atoms). Thus, compounds such as poly(vinyl chloride), tetrabromophthalic anhydride and tetrachlorophthalic anhydride may be included among the latter type non-reactive fire retardants. Additionally, a number of inorganic non-isocyanate reactive compounds such as antimony trioxide, dibasic ammonium phosphate and ammonium polyphosphate are also known to impart at least some degree of fire retardancy to polyurethane foam.

The employment of non-reactive, organic fire retardants, many of which are known to be plasticizers for a number of polar polymers, in the prior art rigid polyurethane foam compositions often adversely affects the physical properties of rigid foam moldings obtained with said formulations [Landrock, A, Polyurethane Foams: Technology, Properties and Applications, DOD Publication Plastic Report 37 (AD 688132) 37, (1969)]. Thus, while fire retardancy is achieved in the prior art foam moldings, when non-reactive organic fire retardants are used, these moldings often lack the physical properties and/or environmental resistance necessary for their utilization as articles of commerce. The deterioration of physical properties and/or environmental resistance of the prior art moldings, upon addition of non-reactive organic fire retardants to the polyurethane foam formulations, is a distinct disadvantage to the use of said prior art polyurethane foam compositions in molding useful articles of commerce. Rigid foam moldings prepared via prior art polyurethane foam processes employing non-reactive organic fire retardants have been found to exhibit cracking and significant dimensional change upon exposure to boiling water for 30 minutes.

By way of an example of the importance of preserving environmental resistance, reusable trays or containers which come in contact with food directly or indirectly can be made from rigid polyurethane foam. Such trays or containers being of light weight and relatively high strength must be stable to cleaning methods which employ boiling water as part of the cleaning process. Failure of such trays or containers to be stable to exposure to boiling water by exhibiting cracking and/or warping renders said trays and containers relatively useless for the intended application. In view of the increasing concern over fire safety it is becoming increasingly required that such trays and containers be fire-retardant. The imparting of fire-resistance to the aforementioned trays or containers without detracting from their environmental resistance (e.g., resistance to boiling water) is therefore of importance. Prior art processes employing non-reactive type organic fire-retardants while imparting fire-resistance to the rigid polyurethane foam have at the same time detracted from the environmental resistance (e.g., resistance to boiling water) of said rigid polyurethane foam, in relation to the rigid polyurethane foam obtained from the same constituents but in the absence of the fire-retardant. Thus the aforementioned prior art processes for making fire-retardant, rigid polyurethane foam would not provide the desired product, namely, rigid polyurethane foam trays or containers which are fire-retardant while being resistant to boiling water.

The use of reactive type fire-retardant additives (i.e., halogen and/or phosphorus containing hydroxyl terminated organic compounds) instead of non-reactive fire retardant additives in the prior art polyurethane foam compositions often overcomes many of the disadvantages of the non-reactive fire retardant additives, with respect to the physical properties and/or environmental resistance of the rigid foam moldings. Fire-retardant moldings having high physical strength properties and/or environmental resistance may thus be achieved with prior art polyurethane foam compositions containing reactive fire-retardant additives. These isocyanate reactive fire-retardant additives (e.g., hydroxy terminated halogenated organic esters of phosphoric or phosphorous acid) when employed in the art as partial or complete replacement for the polyol component of the polyurethane foam formulation often detracted from the moldability of the polyurethane foam composition. Additionally, the often somewhat limited hydrolytic stability of the reactive fire-retardant additives presented processing disadvantages, especially with respect to achieving reproducible foaming and therefore consistent molding behavior.

To prepare useful fire retardant articles of commerce it is necessary not only to achieve the requisite fire retardancy while maintaining good physical properties but it is also necessary for the foam formulation to exhibit good moldability. Good moldability may be described as the ability of the foam formulation to consistently yield completely filled out uniform moldings which are free of surface and internal defects (e.g., blisters, voids, splits, etc.). In the prior art processes, polyurethane foams having combinations of fire retardancy and moldability or moldability and good physical properties have been achieved, however, good moldability in combination with fire retardancy while preserving resistance to impact and boiling water has not been achieved.

This invention relates to cured, fire-retardant, rigid polyurethane foams and more specifically to quasi-prepolymer processes for obtaining fire-retardant, rigid polyurethane foams wherein an isocyanate terminated product obtained by reacting a stoichiometric excess of a polyisocyanate with an organic compound containing two terminal hydrogen atoms reactive to isocyanate groups, is reacted with a polyether polyol having at least 4 hydroxyl groups per molecule (e.g., a polyol obtained by reacting an alkylene oxide with a polyhydroxy compound having at least 4 hydroxyl groups per molecule) in the presence of a specific non-isocyanate reactive organic fire-retardant composition and a blowing agent and optionally in the presence of a catalyst and surfactant. The quasi-prepolymer technique is preferred in the practice of this invention because the inherent deficiencies in one-shot techniques are accentuated when the latter method is applied to this invention. The one-shot method inherently has a higher exotherm temperature which promotes internal scorching and undesirable surface properties of the foam articles. Also when the fire-retardant and other components are all mixed together to form the one-shot charges, many of the components resist thorough mixing and even separate out.

The processes of this invention lead to highly uniform foam products having fire-resistance while being resistant to impact and boiling water. In a preferred molding process of this invention, self skinned articles can be obtained wherein the skin is relatively dense but the core is less dense. This invention involves the use of specific fire-retardant compositions which do not detract from the properties of the ultimate product but which enable said product to resist heat and resist flame spreading once the ignition point is reached.

It has been found that the use of a number of known fire-retardant agents can make a polyurethane foam "non-burning" as is determined by ASTM test (D-1962) but not by ASTM test (E-84). The flame spread of such articles, as tested by ASTM (E-84), Tunnel Test, is not at all satisfactory. The Tunnel Test being well recognized and a more severe test than D-1692 was therefore chosen as a more accurate measure of the degree to which fire resistance has been achieved.

It is, therefore, an object of this invention to provide rigid polyurethane foam processes which, in contrast to the prior art, yield rigid, cellular polyurethane moldings having fire retardancy, while being resistant to impact, and resistant to boiling water. It is another object of this invention to provide cured, rigid polyurethane foam moldings having fire retardance, while being resistant to impact and boiling water. It is still another object of this invention to overcome the disadvantages of the prior art. Another object of this invention is to provide cured, fire-retardant, molded, rigid polyurethane foam articles useful in commerce.

These and other objects and advantages of the present invention will become more apparent to those skilled in the art from the following description and examples.

We have discovered that impact resistant, fire-retardant, cured, rigid polyurethane foam moldings which are resistant to boiling water can be achieved by reacting an isocyanate terminated reaction product, obtained by reacting a stoichiometric excess of an aromatic polyisocyanate with a difunctional compound, with a polyether polyol which is preferably the product of the reaction of an alkylene oxide or mixture of alkylene oxides with an alkyl, aryl, aralkyl or heterocyclic polyhydroxy compound having at least 4 hydroxyl groups per molecule, or a mixture of polyether polyols containing at least one polyether polyol which is the product of the reaction of an alkylene oxide or mixture of alkylene oxides with an alkyl, aryl, aralkyl or heterocyclic polyhydroxy compound having at least 4 hydroxyl groups per molecule in the presence of a catalyst, surfactant, blowing agent and non-isocyanate reactive organic compounds having a molecular weight of at least 500 and containing halogen and phosphorus atoms at least one of said halogen atoms being bromine or mixtures of non-isocyanate reactive organic compounds said mixtures having an average molecular weight of at least 500 and consisting of organic compounds containing halogen and/or phosphorus atoms at least one compound of said mixture containing one or more bromine atoms.

We have further discovered that cured, fire-retardant, rigid polyurethane foam moldings which are resistant to impact and boiling water can be advantageously achieved by processes which comprise reacting 1) an isocyanate terminated reaction product obtained by reacting a stoichiometric excess of an aromatic polyisocyanate with a difunctional organic compound (e.g., a poly(oxyalkylene) diol) with 2) a polyether polyol which is preferably the product of the reaction of an alkylene oxide or mixture of alkylene oxides with an alkyl, aryl, aralkyl, cycloalkyl or heterocyclic polyhydroxy compound having at least 4 hydroxyl groups per molecule, or a mixture of polyether polyols containing at least one polyether polyol which is the product of the reaction of an alkylene oxide or mixture of alkylene oxides with an alkyl, aryl, aralkyl, cycloalkyl or heterocyclic polyhydroxy compound having at least 4 hydroxyl groups per molecule, in the presence of 3) a catalyst, 4) a surfactant, 5) a blowing agent and 6) an organic compound which does not contain Zerewitinoff active hydrogen atoms or a mixture of organic compounds which do not contain Zerewitinoff active hydrogen atoms, said organic compound or mixture of organic compounds characterized by an average molecular weight of at least 500 and containing chlorine, bromine and phosphorus atoms such that the chlorine and bromine atoms are attached directly to carbon atoms and such that the weight ratio of chlorine plus bromine to phosphorus shall be at least 2:1 but not more than 14:1 and such that the weight ratio of bromine to chlorine shall be at least 1:1 but not more than 4:1.

The polyisocyanates useful in the practice of this invention (i.e., polyisocyanates useful in the preparation of the isocyanate terminated reaction product employed in this invention) are organic compounds having at least two isocyanate groups per molecule and may be aliphatic, aromatic, heterocyclic, or aryl-alkyl in nature. Non-limiting examples of the polyisocyanates useful in this invention include: (1) 2,4- or 2,6- tolylene diisocyanate or isomer mixtures thereof, (2) crude tolylene diisocyanate which is an undistilled product generally consisting of 70 percent monomeric and 30 percent of polymeric species, (3) 4,4°-diphenyl methane diisocyanate (MDI), (4) crude MDI which is an undistilled product consisting of approximately 55 percent 4,4'- and 2,4'-isomers, 25 percent triisocyanate and 20 percent polymeric isocyanates. The commercial polymethylene polyphenyl isocyanate products available today vary primarily in their molecular weight and molecular weight distribution and, thus, in their functionality and can be represented as follows:

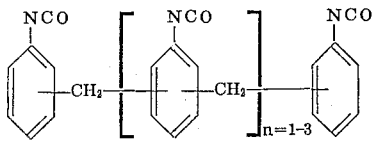

(5) other aromatic diisocyanates such as: p-phenylene diisocyanate, m-phenylene diisocyanate, 1-chloro-2,4-phenylene diisocyanate, 3,3'-dimethyl-4,4'-bisphenylene diisocyanate, 3,3'-dimethoxy-4,4'-bisphenylene diisocyanate, 4,4'-Bis-(2-methyl-isocyanotophenyl) methane and 4,4'-Bis-(2-methoxyisocyanotophenyl) methane, (6) partially or completely hydrogenated analogs of above and (7) aralkyl polyisocyanates (e.g., meta xylene diisocyanates).

In the preparation of the isocyanate terminated reaction product employed in this invention a difunctional organic compound (i.e., organic compound having two terminal, isocyanate reactive groups per molecule) is reacted with a stoichiometric excess of the organic polyisocyanate. It is recognized that while organic compounds containing two hydroxyl groups per molecule are preferably employed in the preparation of the isocyanate terminated reaction product, other organic compounds having two isocyanate reactive groups per molecule may be suitable for the formation of the isocyanate-terminated product. Thus organic compounds containing two terminal isocyanate reactive groups per molecule, other than two terminal hydroxyl groups, may include those having terminal amino, amido, carboxyl, mercapto, sulfonic acid, phosphino and the like groups. Organic compounds having two different terminal, isocyanate reactive groups (e.g., one hydroxyl and one amino group; one hydroxy and one carboxyl group; one amino and one carboxyl group) may also be employed.

As non-limiting examples of compounds contemplated within the scope of the difunctional organic compounds, there are poly(oxyalkylene) diols, e.g., poly(oxyethylene) diols, poly(oxypropylene) diols, and poly(oxybutylene) diols; polyalkylene diols, e.g., polyethylene diols, polypropylene diols, and polybutylene diols; poly(oxyalkylene) diamines, e.g., poly(oxyethylene) diamine, poly(oxypropylene) diamine, and poly(oxybutylene) diamine; polyalkylene diamines, e.g., polyethylene diamines, polypropylene diamines, and polybutylene diamines; ω-amino-poly(oxyalkylene) alcohols; ω-amino-polyalkylene alcohols; poly(oxyalkylene) dicarboxylic acids, e.g., poly(oxyethylene) dicarboxylic acid, poly(oxypropylene) dicarboxylic acid and poly(oxybutylene) dicarboxylic acid; polyalkylene dicarboxylic acids; ω-hydroxy-poly(oxyalkylene) carboxylic acids; ω-amino-poly(oxyalkylene) carboxylic acids; poly(oxyalkylene) dicarboxamides; polyalkylene dicarboxamides; and the corresponding dithiols, disulfonic acids, diphosphines, disulfonamides, the corresponding difunctional compounds of mixed functions, and the like. Diols in particular have been found to yield good results and some diols particularly suitable for use in the practice of this invention include poly(oxyethylene) diols, poly(oxypropylene) diols, poly(oxybutylene) diols and mixtures or copolymers thereof. Isocyanate terminated reaction products employed in this invention which are obtained by the reaction of poly(oxyalkylene) diols with the organic polyisocyanate often exhibit relatively low viscosities and such low viscosities can be desirable in the practice of this invention. The isocyanate terminated reaction products used in the practice of this invention are preferably prepared by reacting a poly(oxyalkylene) diol or mixture of poly(oxyalkylene) diols with a stoichiometric excess of the organic polyisocyanate under controlled conditions. By way of an example of a method for obtaining the isocyanate terminated reaction product a poly(oxyalkylene) diol is allowed to mix with a stoichiometric excess of an organic polyisocyanate in an inert, essentially moisture free atmosphere and the temperature of the mixture controlled so as not to rise above 70°C due to the exothermic heat of reaction between the diol and polyisocyanate. After a period of continuous mixing of from 30 minutes to 2 hours the exothermic reaction and thus the heat due to said reaction begins to subside and upon cooling to room temperature the desired isocyanate terminated reaction product is obtained.

The compounds referred to as having a plurality of active hydrogens for reaction with the isocyanate terminated product previously described may be polyhydroxy compounds such as triols, tetrols, pentols, hexols, octols, and other polyether polyols; a less preferred method can utilize polyester polyols. The polyester polyols are linear hydroxyterminated polyesters such as can readily be prepared by reaction of polyfunctional acids, such as adipic acid, with polyhydroxy compounds, such as ethylene glycol. Hydroxyl terminated polyethers are prepared commercially by the addition of alkylene oxides, such as ethylene, propylene, or butylene oxide, to polyhydroxy initiator compounds. The polyhydroxy initiator compounds used in the manufacture of polyether polyols are alkyl, aryl, aralkyl, cycloalkyl, or heterocyclic polyhydroxy compounds and include triols (e.g., glycerol, trimethylolpropane and 1,2,6-hexanetriol), tetrols (e.g., pentaerythritol and α-methyl glucosides), hexitols (e.g., sorbitol) and octols (e.g., sucrose). These and other polyhydroxy compounds may be mixed in various combinations prior to alkoxylation to produce the desired polyetherpolyols or the various polyetherpolyols may be admixed after their preparation. Polyether polyols which can be employed in the practice of this invention, for reaction with the previously described isocyanate terminated reaction product, include those containing 4,5,6,7 and 8 hydroxyl groups per molecule. Mixtures of polyols wherein the mixture contains at least one polyether polyol having at least 4 hydroxyl groups per molecule may also be employed in the practice of this invention. Non-limiting examples of polyether polyols, prepared by methods known in the art, which contain 4,6 and 8 hydroxyl groups per molecule include those prepared by the reacting of one or more alkylene oxides such as for example ethylene oxide, propylene oxide and butylene oxide with polyhydroxy compounds (i.e., polyhydroxy initiators) such as α-methyl glucoside, pentaerythritol, sorbitol and sucrose. Thus a polyether polyol having 4 hydroxyl groups per molecule would be obtained by the reaction of an alkylene oxide with α-methyl glucoside while the reaction of an alkylene oxide with sorbitol would lead to a polyether polyol having 6 hydroxyl groups per molecule. An alkylene oxide reacted with sucrose would yield a polyether polyol having 8 hydroxyl groups per molecule.

In the practice of this invention foaming may be carried out by methods well known in the art. Thus in one method well known to the art water or a carboxyl containing organic compound may be employed which reacts with the polyisocyanate to generate gaseous carbon dioxide which in turn causes expansion of the polyurethane material to yield a foam. In another method well known to the art an inert (i.e., non-isocyanate reactive), low boiling, liquid organic compound (e.g., a halogenated hydrocarbon) may be employed which vaporizes due to the heat generated by the reaction between isocyanate groups and hydroxyl groups. This vaporization in turn causes expansion of the polyurethane material leading to the formation of a foam. Examples of inert, low boiling, liquid organic compounds include trichloromonofluoromethane, dichlorodifluoromethane, symmetrical tetrachlorodifluoroethane, symmetrical tetrafluorodichloroethane, trichlorofluoroethane, methylene chloride and hexane. Mixtures of inert, low boiling organic liquids such as for example a mixture of trichloromonofluoromethane and dichlorodifluoromethane may be used in the practice of this invention.

Surfactants usually employed in the manufacture of rigid polyurethane foams to aid in the dispersion or emulsification of reactants in each other, and as an aid in nucleation, growth and stabilization of cells during the critical stages of the polymerization may be used in the practice of this invention. Various commercially available surfactants known to the art especially those of the polydimethylsiloxaneoxyalkylene copolymer type function efficiently in the practice of the invention.

Catalysts commonly employed in the preparation of polyurethanes and which are applicable in the practice of this invention are tertiary amines, (e.g., triethylene diamine, N-alkyl morpholines, N,N, N',N'-tetramethylethylenediamine, N,N,N',N'-tetramethyl-1,3-butanediamine, N,N'-substituted piperazines, and dialkylakanolamines), metal salts (e.g., stannous octoate, dibutyltin dilaurate, lead octoate or naphthenate, ferric acetylacetonate). Mixtures of tin compounds and tertiary amines in certain instances are very effective and seem to show synergism. The combination of N,N,-N',N'-tetramethyl-1,3-butane diamine with the diacetate salt of a tertiary amine (e.g., N, N, N', N'-tetramethyl-1,3-butanediamine or N,N,N',N'-tetramethyl-ethylene diamine) has also been found to help regulate the free blow and moldability characteristics of a polyurethane system while simultaneously furnishing a foam having the desired physical properties.

A preferred catalyst is N,N,N',N'-tetramethyl-1 3-butane diamine (TMBDA). This is used in its free state or in the form of a delayed action catalyst (DAC).

DAC is made e.g. by combining a TMBDA with 2 moles of glacial acetic acid under a nitrogen atmosphere at a temperature below 150°C while stirring. Such a catalyst may be mixed 2–3 hours before molding and added by injection into a given component via e.g., a hypodermic needle. Various organic salts of tertiary amines may be employed in the practice of this invention.

Polyurethane foams being organic in composition are readily combustible unless some means is provided to render them flame-retardant. The flammability of polyurethane foams is thus a factor limiting their greater use. Generally, a number of ways have been employed to improve the flame-retardant properties of polyurethane systems: incorporation of organic and/or inorganic reactive or non-reactive additives containing phosphorus, nitrogen and/or halogens, or coating the flammable foam with frame-retardant material.

The mechanisms by which the various flame-retardant compounds improve flame retardance are not completely understood. However, phosphorus compounds are believed to favor char formation and halogen compounds are believed to act as chain stoppers in the free-radical chain reactions involved in the decomposition of the polymer into combustible gasses. In this discussion of non-reactive fire-retardants usable in the practice of this invention reference is made to organic compounds. This reference should be understood to refer to organic compounds having a boiling point of at least 75°C and which are described by the following general formula.

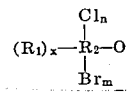

where
$R_1$ is hydrogen or an organic radical free from Zerewitinoff active hydrogen atoms and linked by a carbon to carbon bond or by an O, S, N or

bridge to a carbon atom of $R_2$ (e.g., lower alkoxy, lower alkyl ester, lower alkyl thioether, di-lower alkyl amino or polymeric residue such as that derived from polyvinyl chloride). $R_2$ is an aliphatic or cyclic radical having 1 to 12 carbon atoms which free from Zerewitinoff active hydrogen atoms. Q is hydrogen or a monomeric or polymeric phosphoric or phosphorous acid ester residue which contains further $R_1$ and/or $R_2$ groups bonded to phosphorus by carbon-phosphorus bond or by a carbon-oxygen-phosphorus bond.

$x$ = the number of free valances on $R_2$
$m$ = o or an integer
$n$ = o or an integer
$m$ must be an integer when Q is hydrogen and $n$ is o $n$ must be an integer when Q is hydrogen and $m$ is o Non-reactive fire-retardant additives preferably employed in the practice of this invention include organic compounds which do not contain Zerewitinoff active hydrogen atoms or mixtures of organic compounds which do not contain Zerewitinoff active hydrogen atoms, said organic compounds or mixtures of organic compounds being characterized by an average molecular weight of at least 500 and containing chlorine bromine and phosphorus atoms such that the chlorine and bromine atoms are attached directly to carbon atoms and such that the weight ratio of chlorine plus bromine to phosphorus is at least 2:1 but not more than 14:1 and such that the weight ratio of bromine to chlorine is at least 1:1 but not more than 4:1, which are exemplified by chlorobrominated organic esters of phosphoric or phosphorous acid; mixtures containing chlorinated non-phosphorous containing organic compounds, brominated non-phosphorus containing organic compounds and organic esters of phosphoric or phosphorous acids; mixture comprising chlorobrominated non-phosphorus containing organic compounds and organic esters of phosphoric or phosphorous acid; mixtures comprising chlorinated non-phosphorus containing compounds and brominated organic esters of phosphoric or phosphorous acid; mixtures comprising brominated non-phosphorus containing organic compounds and chlorinated organic esters of phosphoric or phosphorous acid; and mixtures comprising chlorinated organic esters of phosphoric or phosphorous acid and brominated organic esters of phosphoric or phosphorous acid. Minor proportions of the non-reactive fire-retardant additives preferably 2 to 30 percent and most preferably 5 to 18 percent by weight of the total formulation are employed in the practice of this invention. The compound or compounds selected can be added to either the polyol or the isocyanate terminated product or part can be added to each in mixing the foamable compositions.

Examples of compounds which can be used in the practice of this invention are tris (2,3-dibromopropyl) phosphate, a chloroethyl ester of phosphorous acid having the following reported structure

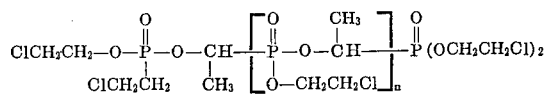

where $n = 0-5$
and hexabromocyclododecane. Tris (1-bromo, 3-chloroisopropyl) phosphate is an example of a singular fire retardant compound usable in the practice of this invention. Inorganic materials which have also been found to be useful but not preferred in the practice of the invention include dibasic ammonium phosphate and ammonium polyphosphate.

When a mixture of fire retardants is used, the average molecular weight ($MW_{av}$) must be at least 500, as determined by the following formula $$MW_{av} = 100/\Sigma_i E_i$$

where:

$E$ = weight percent of fire retardant component in total blend of fire retardants/molecular weight of the fire retardant component $\Sigma_i E_i$ = sum of individual values E in mixture and $MW_{av}$ = average molecular weight For example in a 50-50 (by weight) mixture of two fire retardants A and B wherein the molecular weight of A is 1000 and the molecular weight of B is 200 we obtain:

$$MW_{av} = 100/(50/1000 + 50/200)$$
$$MW_{av} = 100/(0.05 + 0.25)$$
$$MW_{av} = 100/0.30$$
$$MW_{av} = 333$$

In a preferred practice of this invention the mixed liquid polyurethane foam components are charged into a previously heated, fixed volume, closable mold in an amount at least twice that which would be required to give the same volume as that of the mold cavity where the foam components are allowed to free blow, thereafter, the charged components are allowed to foam in the closed mold and are thereafter cured. A molded polyurethane foam article will be obtained which completely fills the mold and has an overall density at least 100 percent greater than the free blow density (uncontrolled foaming in an open container) of the same foam formulation and has greatly improved characteristics such as high structural strength and a dense, hard, smooth skin or layer on the exterior surfaces of the molded article. Best results are achieved if one end of the longest dimension of the mold is slightly raised from the horizontal to permit more complete and rapid expansion in the mold cavity.

To determine in advance the amount of charge of polyurethane foam composition of known free-blow density which need be placed in a mold of known volume to give an article of any desired overall density from 100 percent of the ultimate free blow density upwards, the calculation is as follows. For example, in the case of a mold having a volume of one cubic foot, if one employs a polyurethane foam having a free blow density of 5 pounds per cubic foot and desires a molding of 20 pounds per cubic foot overall density, one would place 20 pounds of foam components in the mold to achieve a packing factor of 4, said packing factor being one controlling feature in obtaining the resultant improved products of this molding process.

The fixed volume, closable mold into which the charge of mixed foam components is placed is desirably heated prior to introduction of the charge, to a temperature of at least about in the range of 110° to 150°F, preferably about 120° to 140°F. After closing the mold, foaming and precure is allowed to take place for an interval of 1 to 4 minutes, during which time the mold is at a temperature about or slightly greater than that of the foam component mixture added to the mold. Following completion of this foaming reaction, i.e., expansion to form a cellular product in the closed mold, which normally takes place in 1 to 4 minutes, the foamed material in the closed mold is cured, e.g., by maintenance of the heat or addition of heat to the mold, this heating interval being dependent upon the type of heat applied. Thus with induction or high frequency heating cure may be accomplished rapidly while more conventional infrared, hot air, or like heating may require from 10–30 minutes. The resulting product is found to have a smooth, hard, abrasion-resistant skin of relatively high density on its outer surfaces, totally enclosing and integral with an inner, more cellular structure, the overall density of the product being at least 100 percent greater than the free-blow density (preferably 15–40 lbs/ft$^3$). It is thus possible to prepare articles of high strength and uniformity and which are exteriorly smooth.

Drop ball impact strengths are determined on self-skinned polyurethane moldings ½ × 4 × 10 in. of 22 lb./ft.$^3$ overall density. The moldings are cut in half to furnish two pieces ½ × 4 × 5 in. To determine the drop ball impact strength, one of the ½ × 4 × 5 in pieces is centered on a 3 inches diameter steel ring and clamped down on two opposite sides to hold the piece in position. The apparatus is so constructed that a 1 ½ in. diameter (225 grams) steel ball may be dropped onto the center of the 4 inches × 5 inches face of a test sample from progressively greater heights, each successive impact being from a 4 inches greater height. After each drop, the specimen is observed for cracking on either side and failure is the point at which cracking is noted. The drop ball impact strength is then the total drop height in inches time one-half pound. A reported drop ball impact strength value represents the average of two experimental determinations.

Flame spread tests were carried out according to the ASTM E–84 (Steiner tunnel) test method on 22 lb/ft$^3$ density ½ × 20 × 50 in. self-skinned moldings. Six panels are needed to furnish the requisite 25 feet of test surface. The flame spread rating represents a value relative to 100 which is the arbitrary calibration standard based on flooring-type red oak boards conditioned in a specific manner prior to testing. Non-flame retardant polyurethane foams produce flame spread ratings of 500–700.

The 30 minute boiling water test consists of immersing a 1 × 2 × 2 in. rigid, self-skinned polyurethane molding of 22 lbs/ft$^3$ overall density under the surface of boiling water for one half hour. The test sample(s) is held submerged below the liquid surface by using a ⅜ in. mesh screen. At the conclusion of the test, the sample is removed from the water, dried off and observed for dimensional change, color change, formation of surface cracks, bumps, splitting or catastrophic failure. A test piece is said to pass the 30 minute boiling water test when the surface of the test piece has not formed bumps or cracks nor has it split and has shown essentially no change in dimensions.

The following non-limiting examples further illustrate the practice of this invention. Examples 1 and 2 are comparative examples to illustrate practices not within the scope of the claimed invention and the properties of molded polyurethane foam obtained by said practices.

EXAMPLE 1

This example illustrates a practice, not within the scope of the claimed invention, which leads to a molded polyurethane foam having resistance to impact but lacking resistance to boiling water and having poor fire-retardancy.

54.97 grams of a quasi-prepolymer at 100°F having a viscosity of 2305 cps at 70°F and a free isocyanate content of 25.5 percent by weight obtained by reacting 500 parts by weight of a polymethylene polyphenyl isocyanate having a free isocyanate content of 31.6 percent with 65.19 parts by weight of a poly(oxypropylene) diol having an average molecular weight of about 400 (OH No.-285.8) were thoroughly mixed with 60.63 grams of a polyol blend at 70°F comprised of 19.07 parts by weight of tris(2,3-dichloropropyl) phosphate, 67.76 parts by weight of a polyoxypropylated (α-methyl glucoside-glycerine) mixture having an OH No.-434, 1.35 parts by weight of a dimethyl silicone-alkylene oxide copolymer surfactant, 10.49 parts by weight of monofluorotrichloromethane, 0.667 parts by weight of N,N,N′,N′-tetramethyl-1,3-butane diamine and 0.667 parts by weight of the diacetate salt of N,N,N′,N′-tetramethyl-1,3-butane diamine hereinafter to be designated as DAC, prepared by the reaction of 2 moles of acetic acid with one mole of N,N,N′,N′-tetramethyl-1,3-butane diamine. The resulting mixture when permitted to free-blow in an unwaxed paper cup yielded a closed cell, rigid polyurethane foam having a density of 4.3 lbs/ft$^3$. However, when an equal quantity of the said mixture was charged to a 20 in.$^3$ aluminum mold preheated to 135°F, the mold closed and clamped and then placed in a 180°F circulating air oven for 20 minutes a self-skinned, rigid foam molding was obtained having the following properties:

| | |
|---|---|
| Overall Density | 22 lbs./ft.$^3$ |
| Barcol Hardness | 45 |
| Drop Ball Impact Strength | 42 inch-lbs. |

The above described formulation at the same quasi-prepolymer to polyol blend ratio indicated and in the proper quantity (about 2910 grams) was used to prepare 22 lb./ft.$^3$ density, ½ × 20 × 50 inch self-skinned foam moldings which exhibited a flame spread rating of 470 when tested in accordance with the procedures of ASTM E–84 (Steiner) tunnel test.

The drop ball impact test was carried out as described previously and the Barcol hardness test as described in ASTM Proc. 47, 1017 (1947) and British Plastics 35(2), 80 (1962).

The material failed the boiling water test.

EXAMPLE 2

This example illustrates a practice, not within the scope of the claimed invention, which leads to molded polyurethane foam having good fire-retardancy and resistance to impact but poor resistance to boiling water.

56.84 grams of a quasi-prepolymer at 100°F and having a free isocyanate content of 25.5 percent by weight and whose preparation is described in Example 1 were thoroughly mixed with 58.76 grams of a polyol blend at 70°F comprised of 9.84 parts by weight of tris(2,3-dibromopropyl) phosphate, 9.84 parts by weight of tris (β-chloroethyl) phosphate, 46.71 parts by weight of a polyoxypropylated (α-methyl glucoside-glycerine) mixture having an OH No.-434, 20.02 parts by weight of a polyoxypropylated (α-methyl glucoside-glycerine) mixture having an OH No.-555, 0.59 parts by weight N,N,N′,N′-tetramethyl-1,3-butane diamine, 0.787 parts by weight DAC, 1.39 parts by weight of a surfactant described in Example 1, 10.821 parts by weight of monofluorotrichloromethane. The resulting mixture furnished a free blown rigid foam having a density of 4.4 lbs./ft.³. A molding prepared according to the procedure described in Example 1, which exhibited the following properties:

| Overall Density | 22 lbs./ft.³ |
| Barcol Hardness | 27 |
| Drop Ball Impact Strength | 36 Inch-lbs. |

When ½ × 20 × 50 in., 22 lbs./ft.³ overall density, self-skinned moldings were tested in accordance with the procedures of ASTM E–84 a flame spread rating of 60 was obtained.

The material has poor resistance to boiling water.

EXAMPLE 3

The following example represents one of the preferred embodiments of the invention and in which the polyisocyanate and polyol masterbatch components each contain a flame retardant agent. 61.97 grams of a quasi-prepolymer blend at 100°F and comprising 90.67 parts by weight of a quasi-prepolymer having a viscosity of 2305 cps. at 70°F and having a 25.5% free isocyanate and whose preparation is detailed in Example 1 and 9.33 parts by weight of a chloroethyl ester of phosphorous acid having the following structure

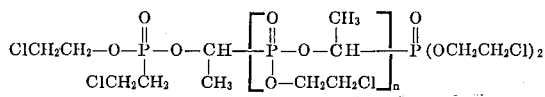

$n = 0-5$ were thoroughly mixed with 53.63 grams of a polyol blend at 70°F having a viscosity of 3540 cps. at 70°F and comprising 10.78 parts by weight of tris(2,3-dibromopropyl) phosphate, 50.37 parts by weight of a polyoxypropylated (α-methyl glucoside-glycerine) mixture having an OH No.-437, 21.59 parts by weight of a polyoxypropylated (α-methyl glucoside-glycerine) mixture having an OH No.-555, 0.65 parts by weight of N,N,N′,N′-tetramethyl-1,3-butane diamine, 0.862 parts by weight DAC, 1.53 parts by weight of a surfactant described in Example 1, 12.80 parts by weight of monofluorotrichloromethane and 1.42 parts by weight of dichlorodifluoromethane. The resulting mixture furnished (1) a free blown rigid foam having a density of 4.2 lbs./ft.³ and (2) a molding prepared as described in Example 1 which exhibited the following properties:

| Overall Density | 22 lbs./ft.³ |
| Barcol Hardness | 45 |
| Drop Ball Impact Strength | 41 inch-lbs. |

When ½ × 20 × 50 in., 22 lb./ft.³ overall density, self-skinned moldings were tested in accordance with the procedures of ASTM E–84, a flame spread rating of 40 was obtained.

EXAMPLE 4

This example represents a variation on the process of Example 3. 68.60 grams of a quasi-prepolymer blend at 100°F comprising 83.2 parts by weight of a quasi-prepolymer having a 25.5 percent free isocyanate and whose preparation is detailed in Example 1, 8.4 parts by weight of a chloroethyl ester of phosphorous acid which is described in Example 3 and 8.4 parts by weight of tris(2,3-dibromopropyl) phosphate were mixed thoroughly with 47.00 grams of a polyol blend at 70°F composed of 46.03 parts by weight of a polyoxypropylated (α-methyl glucoside-glycerine) mixture having an OH No.-437, 26.02 parts by weight of a polyoxypropylated (α-methyl glucoside-glycerine) mixture having an OH No.-555, 8.0 parts by weight of a polyoxypropylated glycerine having an OH No.-647, 0.98 parts by weight of N,N,N′,N′-tetramethyl-1,3-butane diamine, 0.98 parts by weight DAC, 1.74 parts by weight of a surfactant described in Example 1 and 16.23 parts by weight of monofluorotrichloromethane. The resulting mixture furnished a free blown rigid foam having a density of 4.2 lbs./ft.³. A molding prepared as described in Example 1 exhibited substantially the same properties as the molding of Example 3.

EXAMPLE 5

This example represents a variation on the process of Example 3. 58.44 grams of a quasi-prepolymer at 100°F having a free isocyanate content of 26.35 percent by weight obtained by reacting 500 parts by weight of a polymethylene polyphenyl isocyanate having a free isocyanate content of 31.6 percent with 54.98 parts by weight of a poly(oxypropylene) diol having an average molecular weight of about 400 (OH No.-288) were thoroughly mixed with 57.16 grams of a polyol blend at 70°F comprised of 10.1 parts by weight of tris(2,3-dibromopropyl) phosphate, 10.1 parts by weight of the chloroethyl ester of phosphorous acid which is described in Example 3, 28.61 parts by weight of a polyoxypropylated (α-methyl glucoside-glycerine) mixture having an OH No.-428, 36.41 parts by weight of a polyoxypropylated (α-methyl glucoside-glycerine) mixture having an OH No.-555, 0.81 parts by weight of N,N,N′,N′-tetramethyl-1,3-butane diamine, 0.81 parts by weight of DAC, 2.02 parts by weight of a surfactant described in Example 1 and 11.12 parts by weight of monofluorotrichloromethane. The resulting mixture furnished 1) a free blown rigid foam having a density of 4.2 lbs./ft.³ and 2) a molding prepared as described in Example 1 exhibited substantially the same properties as the molding of Example 3.

EXAMPLE 6

56.97 grams of a quasi-prepolymer at 100°F having a free isocyanate content of 25.4 percent by weight and whose preparation is detailed in Example 1 were thoroughly mixed with 58.63 grams of a polyol blend at 70°F comprised of 19.71 parts by weight of tris(1-bromo-3-chloroisopropyl) phosphate, 46.66 parts by weight of a polyoxypropylated (α-methyl glucoside-glycerine) mixture having an OH No.-434., 20.00 parts by weight of a polyoxypropylated (α-methyl glucoside-glycerine) mixture having an OH No.-555., 0.59 parts by weight of N,N,N′,N′-tetramethyl-1,3-butanediamine, 0.79 parts by weight of DAC, 1.40 parts by weight of a surfactant described in Example 1 and 10.84 parts by weight of monofluorotrichloromethane. The resulting mixture furnished a free blown density of about 4.4 lbs./ft.³. A molding prepared as described in Example 1 to furnish the following properties:

| Overall Density | 22 lbs./ft.³ |
| Barcol Hardness | 35 |
| Drop Ball Impact Strength | 41 inch - lbs. |

The flame spread rating of samples molded as described in Example 1 furnished a value below 100.

EXAMPLE 7

61.09 grams of a quasi-prepolymer at 100°F having a free isocyanate content of 25.4 percent by weight and prepared substantially as described in example 1 were thoroughly mixed with 54.51 grams of a polyol blend at 70°F comprised of 64.14 parts by weight of a polyoxypropylated (sucrose-glycerine) mixture having a hydroxyl number of 564, 10.60 parts by weight of tris(2,3-dibromopropyl) phosphate, 10.60 parts by weight of the chloroethyl ester of phosphorus acid which is described in example 3, 0.64 parts by weight of N,N,N',N'-tetramethyl-1,3-butane diamine, 0.64 parts by weight of DAC, 1.50 parts by weight of a surfactant described in example 1 and 11.66 parts by weight of monofluorotrichloromethane. The resulting mixture yielded moldings, in accordance with the molding procedure in examples 1 and 11, which exhibited the following properties:

| | |
|---|---|
| Overall Density | 22 lbs/ft³ |
| Barcol Hardness | 47 |
| Drop Ball Impact Strength | 34 Inch-lbs |
| Boiling Water Resistance | Passed |

EXAMPLE 8

61.98 grams of a quasi-prepolymer blend at 100°F comprised of 90.67 parts by weight of a quasi-prepolymer having a free isocyanate content of 25.3 percent by weight and prepared substantially as described in example 1 and 9.33 parts by weight of the chloroethyl ester of phosphorous acid which is described in example 3 were thoroughly mixed with 53.62 grams of a polyol blend at 70°F comprised of 73.14 parts by weight of a polyoxypropylated α-methyl glucoside having hydroxyl number of 461, 10.78 parts by weight of tris (2,3-dibromopropyl) phosphate, 0.65 parts by weight of N,N,N',N'-tetramethyl-1,3-butanediamine, 0.97 parts by weight of DAC, 1.53 parts by weight of a surfactant described in example 1, 11.64 parts by weight of monofluorotrichloromethane and 1.29 parts by weight of difluorodichloromethane. The resulting mixture yielded moldings, in accordance with the molding procedure described in examples 1 and 11, which, exhibited the following properties:

| | |
|---|---|
| Overall Density | 22 lbs/ft³ |
| Barcol Hardness | 48 |
| Drop Ball Impact Strength | 32 inch-lbs |
| Boiling Water Resistance | Passed |

EXAMPLE 9

56.36 grams of a quasi-prepolymer at 100°F having a free isocyanate content of 25.3 percent by weight and prepared substantially as described in example 1 were thoroughly mixed with 59.24 grams of a polyol blend at 70°F comprised of 58.90 parts by weight of a polyoxypropylated α-methyl glucoside having a hydroxyl number of 461, 6.54 parts by weight of an aromatic aminotriol having a hydroxyl number of 525, 0.78 parts by weight of N,N,N',N'-tetramethyl-1,3-butanediamine, 1.17 parts by weight of DAC, 1.38 parts by weight of a surfactant described in example 1, 9.75 parts by weight of tris(2,3-dibromopropyl) phosphate, 9.75 parts by weight of the chloroethyl ester of phosphorous acid which is described in example 3 and 11.71 parts by weight of monofluorotrichloromethane. The resulting mixture yielded moldings, in accordance with the molding procedure described in examples 1, and 11, which exhibited the following properties:

| | |
|---|---|
| Overall Density | 22 lbs/ft³ |
| Barcol Hardness | 45 |
| Drop Ball Impact Strength | 40 inch-lbs |
| Boiling Water Resistance | Passed |

EXAMPLE 10

57.00 grams of a quasi-prepolymer at 100°F having a free isocyanate content of 25.5 percent by weight and prepared substantially as described in example 1 were thoroughly mixed with 58.60 grams of a polyol blend at 70°F comprised of 64.28 parts by weight of a polyoxypropylated sorbitol having a hydroxyl number of 490, 9.86 parts by weight of tris(2,3-dibromopropyl) phosphate, 9.86 parts by weight of the chloroethyl ester of phosphorous acid which is described in example 3, 1.18 parts by weight of N,N,N',N'-tetramethyl-1,3-butanediamine, 1.58 parts by weight of DAC, 1.40 parts by weight of a surfactant described in example 1 and 11.84 parts by weight of monofluorotrichloromethane. The resulting mixture yielded moldings in accordance with the molding procedure described in examples 1 and 11, which exhibited the following properties:

| | |
|---|---|
| Overall Density | 22 lbs/ft³ |
| Barcol Hardness | 51 |
| Drop Ball Impact Strength | 39 inch-lbs |
| Boiling Water Resistance | Passed |

EXAMPLE 11

In addition to the moldings described in example 1 which were used to determine Barcol hardness, drop ball impact strength and flame spread rating as determined by ASTM E–84 an additional part was molded for each example using a 1 × 2 × 2 inch cavity aluminum mold according to the molding technique described in example 1 and the proportions of reactants described in the respective examples. Self-skinned polyurethane foam moldings having a 22 lb./ft.³ overall density were obtained. These moldings were used to conduct the 30-minute boiling water test which is described elsewhere in this patent. A partial summary of the 30-minute boiling water test results obtained for the moldings made with the rigid polyurethane systems described in the individual examples in this patent follows:

| Example | MW of FR additive or Av. MW of Mixture | FS Rating | 30 min. Boiling Water Test |
|---|---|---|---|
| 1 | 431 | 460 | F |
| 2 | 404 av. | 60 | F (bad) |
| 3 | 650 av. | 40 | P |
| 4 | | * | P |
| 5 | | * | P |
| 6 | 568 | * | P |

* See Examples
MW = molecular weight
FR = flame retardant
FS = flame spread
F = failed
P = passed

EXAMPLE 12

57.50 grams of a quasi-prepolymer at 100°F, having a free isocyanate content of 25.1 percent by weight and prepared by reacting a polymethylene polyphenyl isocyanate having a free isocyanate content of about 31.6 percent by weight with a poly(oxypropylene) diol having a molecular weight of about 400 were thoroughly mixed with 58.20 grams of a polyol blend at 70°F comprised of 46.64 parts by weight of a polyoxypropylated (α-methyl glucoside-glycerine) mixture having an OH No. of about 434, 19.99 parts by weight of a polyoxypropylated (α-methyl glucoside-glycerine) mixture having an OH No. of about 555, 9.38 parts by weight of tribromoneopentyl azelate, 10.36 parts by weight of the chloroethyl ester of phosphorous acid described in example 3, 1.40 parts by weight of the surfactant described in example 1, 0.79 parts by weight of N,N,N',N'-tetramethyl-1,3-butane diamine, 1.18 parts by weight DAC and 10.86 parts by weight of monofluorotrichloromethane. The resulting mixture furnished 1) a free blown foam having a density of about 5.40 lbs/ft$^3$, 2) a molding, in accordance with the molding procedure described in example 1, which exhibited the following properties:

| | |
|---|---|
| Overall Density | 22 lbs/ft$^3$ |
| Barcol Hardness | 49 |
| Drop Ball Impact Strength | 41 inch-lbs | and 3) a molding, in accordance with the molding procedure of example 11, which passed the boiling water test described in example 11.

EXAMPLE 13

57.50 grams of the quasi-prepolymer described in example 12, at 100°F were thoroughly mixed with 58.20 grams of a polyol blend at 70°F comprised of 46.64 parts by weight of a polyoxypropylated (α-methyl glucoside-glycerine) mixture having an OH No. of about 434, 19.99 parts by weight of polyoxypropylated (α-methyl glucoside-glycerine) mixture having an OH No. of about 555, 3.82 parts by weight of bis-neopentyl glycol triethylene glycol diphosphite, 3.10 parts by weight of Paroil 170-8 (a chlorinated paraffin having a molecular weight of about 487 and a chlorine content of about 72 percent obtainable from the Dover Chemical Corp.), 12.82 parts by weight of tris(2,3-dibromopropyl) phosphate 1.40 parts by weight of the surfactant described in example 1, 0.79 parts by weight of N,N,N',N' tetramethyl-1,3-butane diamine, 1.18 parts by weight DAC and 10.86 parts by weight of monofluorotrichloromethane. The resulting mixture furnished 1) a free blown foam having a density of about 5.32 lbs/ft$^3$, 2) a molding, in accordance with the molding procedure of example 1, which exhibited the following properties:

| | |
|---|---|
| Overall Density | 22 lbs/ft$^3$ |
| Barcol Hardness | 49 |
| Drop Ball Impact Strength | 38 inch-lbs. | and 3) a molding, in accordance with the molding procedure of example 11, which passed the boiling water test described in example 11.

EXAMPLE 14

57.50 grams of the quasi-prepolymer described in example 12, at 100°F, were thoroughly mixed with 58.20 grams of a polyol blend, at 70°F, comprised of 46.64 parts by weight of a polyoxypropylated (α-methyl glucoside-glycerine) mixture having an OH No. of about 434, 19.99 parts by weight of a polyoxypropylated (α-methyl glucoside-glycerine) mixture having an OH No. of about 555, 9.48 parts by weight of tribromoneopentyl azelate, 6.28 parts by weight of bis-neopentyl glycol triethylene glycol diphosphite, 3.98 parts by weight of Paroil 170-8 (a chlorinated paraffin having a molecular weight of about 487 and a chlorine content of about 72 percent obtainable from the Dover Chemical Corp.), 1.40 parts by weight of the surfactant described in example 1, 0.79 parts by weight of N,N,N',N' tetramethyl-1,3-butane diamine, 1.18 parts by weight of DAC and 10.86 parts by weight of monofluorotrichloromethane. The resulting mixture furnished 1) a free blown foam having a density of about 5.03 lbs/ft$^3$, 2) a molding, in accordance with the molding procedure of example 1, which exhibited the following properties:

| | |
|---|---|
| Overall Density | 22 lbs/ft$^3$ |
| Barcol Hardness | 48 |
| Drop Ball Impact Strength | 42 Inch-lbs | and 3) a molding, in accordance with the molding procedure of example 11, which passed the boiling water test described in example 11.

EXAMPLE 15

57.50 grams of the quasi-prepolymer described in example 12, at 100°F, were thoroughly mixed with 58.20 grams of a polyol blend, at 70°F, comprised of 46.64 parts by weight of a polyoxypropylated (α-methyl glucoside-glycerine) mixture having an OH No. of about 434, 19.99 parts by weight of a polyoxypropylated (α-methyl glucoside-glycerine) mixture having an OH No. of about 555, 10.53 parts by weight of tris(2,3-dichloropropyl) phosphate, 8.61 parts by weight of tribromoneopentyl azelate, 1.40 parts by weight of the surfactant described in example 1, 0.79 parts by weight of N,N,N',N'-tetramethyl-1,3-butanediamine, 1.18 parts by weight of DAC, and 10.86 parts by weight monofluorotrichloromethane. The resulting mixture furnished 1) a free blown foam having a density of about 5.10 lbs/ft$^3$, 2) a molding, in accordance with the molding procedure of example 1, which exhibited the following properties:

| | |
|---|---|
| Overall Density | 22 lbs/ft$^3$ |
| Barcol Hardness | 48 |
| Drop Ball Impact Strength | 38 inch-lbs | and 3) a molding, in accordance with the molding procedure of example 11, which passed the boiling water test described in example 11.

Having illustrated this invention in the foregoing examples, it is to be understood that many variations can be made by those skilled in the art without departing from the spirit and scope of the invention as set forth in the claims.

We claim:

1. An impact resistant, boiling water resistant, cured rigid polyurethane foam molding which is fire retardant, resulting from the reaction of (1) an isocyanate terminated product obtained by the reaction of a stoichiometric excess of an aromatic polyisocyanate with a poly (oxyalkylene) diol, copoly (oxyalkylene) diol, or mixture of poly (oxyalkylene) diols with (2) a polyether polyol having at least 4 hydroxyl groups per molecule which is the product of the reaction of one or more alkylene oxides with an aromatic, araliphatic, cycloalkyl or heterocyclic polyhydroxy compound or a mixture of polyether polyols containing at least one polyether polyol which is the reaction product obtained by reacting one or more alkylene oxides with an aromatic, araliphatic, cycloalkyl or heterocyclic polyhydroxy compound containing at least 4 hydroxyl groups per molecule, in the presence of (3) tris (1-bromo-3-chloroisopropyl) phosphate; (4) one or more blowing agents; and optionally (5) one or more catalysts; and (6) one or more surfactants.

2. The molding of claim 1 wherein said poly (oxyalkylene) diol is a poly (oxypropylene) diol.

3. An impact resistant, boiling water resistant, cured rigid polyurethane foam molding which is fire retardant, resulting from the reaction of (1) an isocyanate terminated product obtained by the reaction of a stoichiometric excess of an aromatic polyisocyanate with a poly (oxyalkylene) diol, copoly (oxyalkylene) diol, or mixture of poly (oxyalkylene) diols with (2) a polyether polyol having at least 4 hydroxyl groups per molecule which is the product of the reaction of one or more alkylene oxides with an aromatic, araliphatic, cycloalkyl or heterocyclic polyhydroxy compound or a mixture of polyether polyols containing at least one polyether polyol which is the reaction product obtained by reacting one or more alkylene oxides with an aromatic, araliphatic, cycloalkyl or heterocyclic polyhydroxy compound containing at least 4 hydroxyl groups per molecule, in the presence of (3) a mixture of organic compounds which do not contain Zerewitinoff active hydrogen atoms, said mixture of organic compounds characterized by an average molecular weight of at least 500 and containing chlorine, bromine and phosphorus atoms such that the chlorine and bromine atoms are attached directly to carbon atoms and such that the weight ratio of chlorine plus bromine to phosphorus shall be at least 2:1 but not more than 14:1 and such that the weight ratio of bromine to chlorine shall be at least 1:1 but not more than 4:1 said mixture of organic compounds consisting of at least two organic compounds selected from the group consisting of a chloro brominated ester of phosphoric acid, a brominated ester of phosphoric acid or phosphorous acid, a chlorinated ester of phosphoric acid or phosphorous acid, a non-halogen containing organic ester of phosphorous acid, or phosphoric acid, a brominated or chlorinated or chlorobrominated non-phosphorus containing organic compound, (4) one or more blowing agents; and optionally (5) one or more catalysts; and (6) one or more surfactants; each of said compounds of said mixture (3) having a boiling point of at least 75°C.

4. The molding of claim 3 wherein said poly (oxyalkylene) diol is a poly (oxypropylene) diol.

5. The foam molding of claim 3 wherein (3) is a mixture which comprises a brominated ester of phosphoric acid and a chlorinated ester of phosphoric acid.

6. The foam molding of claim 3 wherein (3) is a mixture which comprises a brominated ester of phosphoric acid and a chlorinated ester of phosphorus acid.

7. The foam molding of claim 3 wherein (3) is a mixture which comprises a brominated ester of phosphoric acid and a non-phosphorus containing chlorinated organic compound.

8. The foam molding of claim 3 wherein (3) is a mixture which comprises a chlorinated ester of phosphoric acid and a non-phosphorus containing brominated organic compound.

9. The foam molding of claim 3 wherein (3) is a mixture which comprises a non-phosphorus containing chlorinated organic compound, a non-phosphorus containing brominated organic compound and a non-halogen containing organic ester of phosphoric acid.

10. The foam molding of claim 3 wherein (3) is a mixture which comprises a non-phosphorus containing chlorinated organic compound, a non-phosphorus containing brominated organic compound and a non-halogen containing organic ester of phosphorous acid.

11. The foam molding of claim 3 wherein the mixture (3) consists essentially of a chloroethylester of phosphorous acid having the formula

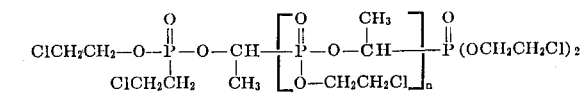

$n = 0-5$ and tris (2,3-dibromopropyl) phosphate.

12. The foam molding of claim 3 wherein the mixture (3) consists essentially of a chloroethyl ester of phosphorous acid having the formula

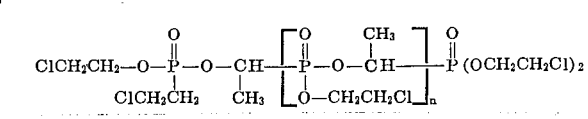

$n = 0-5$ and tribromoneopentyl azelate.

13. The foam molding of claim 3 wherein the mixture (3) consists essentially of tris (2,3-dibromopropyl) phosphate, a chlorinated paraffin of molecular weight about 487 and chlorine content of about 72 percent and bis neopentyl glycol triethylene glycol diphosphite.

14. The foam molding of claim 10 wherein the mixture (3) consists essentially of a chlorinated paraffin of molecular weight about 487 and chlorine content of about 72 percent; bis neopentyl glycol tri ethylene glycol di phosphite and tri bromoneopentyl azelate.

15. The foam molding of claim 8 wherein the mixture (3) consists essentially of tris (2,3 dichloropropyl) phosphate and tribromoneopentyl azelate.

* * * * *